March 11, 1952
W. L. HOWLAND
2,588,840
TEMPERATURE PROBE
Filed Sept. 7, 1946
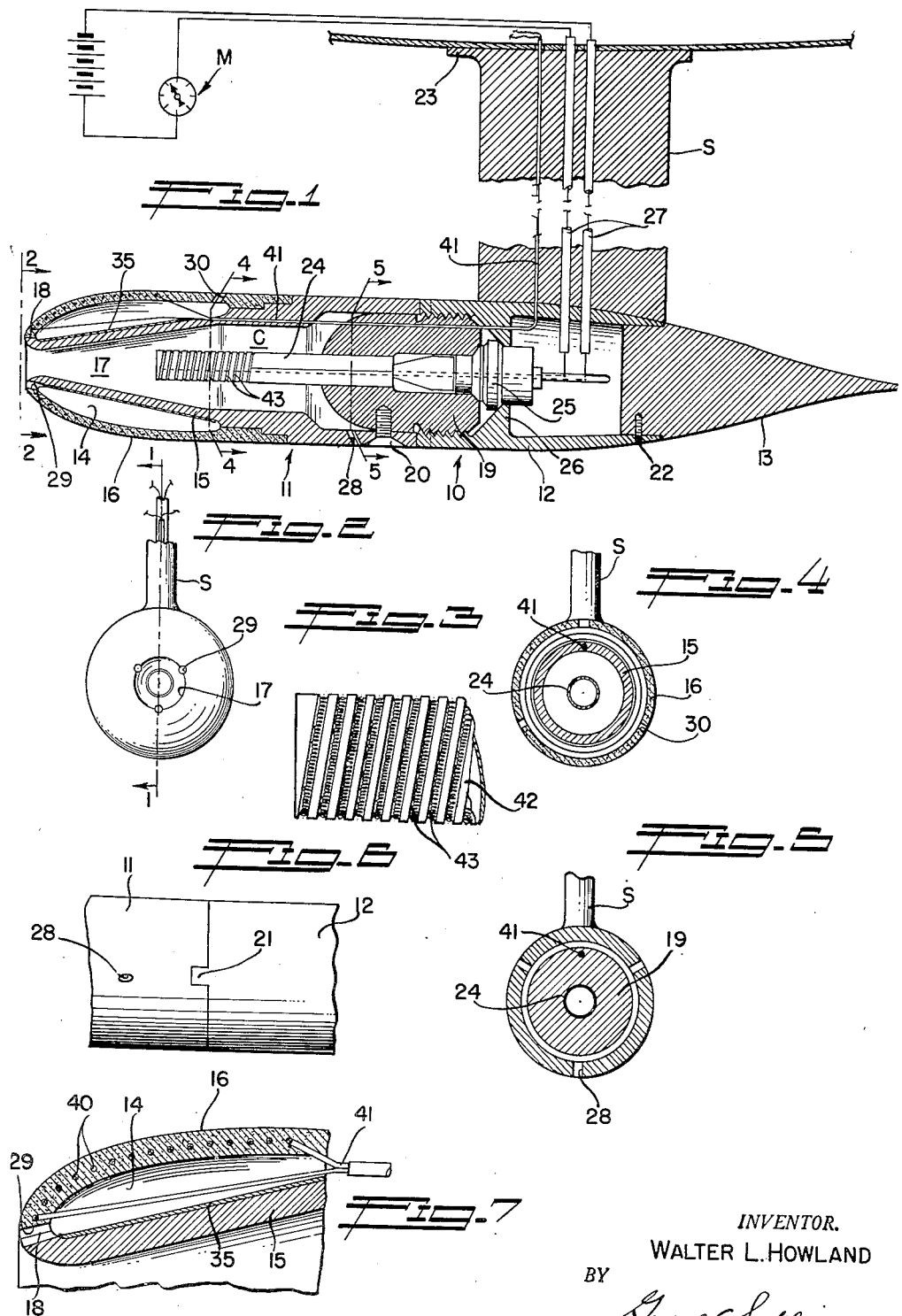
INVENTOR.
WALTER L. HOWLAND
BY
George C. Sullivan
Agent Patented Mar. 11, 1952

2,588,840

UNITED STATES PATENT OFFICE 2,588,840

TEMPERATURE PROBE

Walter L. Howland, Glendale, Calif., assignor to Lockheed Aircraft Corporation, Burbank, Calif.

Application September 7, 1946, Serial No. 695,534

5 Claims. (Cl. 73—349)

This invention relates to temperature measuring devices and relates more particularly to temperature probes for measuring the ambient air temperatures during the flight of high velocity and relatively high velocity aircraft.

The ambient air temperature is one of the most important factors in aerodynamic calculations. Ambient air temperature is sometimes termed "free air temperature" or "outside air temperature." An accurate knowledge of the temperature of the undisturbed air stream during flight is required for a determination of the true air density employed in calculating the true air speed of the airplane. Accordingly, a factor which I shall term the total air temperature, and which is the ambient air temperature plus the full adiabatic temperature rise, is essential in calculating the true air speed of the aircraft. It has in the past been difficult to measure the true temperature of the undisturbed air during flight because a temperature measuring device arranged in the free air stream is materially influenced by the adiabatic compression caused by the slowing down or stopping of the air at the measuring device. Also, certain errors are introduced in the measurement due to the sun's radiation, and due to heat conduction.

A device that recovers only a portion of the adiabatic temperature rise is unsatisfactory owing to the fact corrections for the partial rise in temperature is a complicated process. All the air passing the airplane is subjected to a small temperature rise, and at increased air speeds this rise becomes greater, complicating the determination of the actual total air temperature. If the temperature probe recovers only a fraction of the total temperature, it recovers only a fraction of the change in temperature due to the presence of the airplane. Furthermore, an instrument that recovers only a portion of the total temperature must be located in the air stream at a point where the local velocity is known for all air speeds and elaborate corrections must be made in order to obtain data that is useful.

An object of the present invention is to provide a temperature probe for use on aircraft that is capable of measuring or sensing the "total air temperature"; that is, it is operable to recover the ambient air temperature plus the total adiabatic temperature rise. The device of the invention, by obtaining a true total temperature measurement, avoids the making of elaborate corrections as well as the necessity for positioning the device where the local velocities are known for all air speeds.

Another object of the invention is to provide a temperature probe of the character referred to in which radiation and conduction errors are obviated. In the improved device, an insulating chamber surrounds the principal air chamber which contains the temperature sensitive element, and the insulating chamber is lined with metal foil to reduce radiation losses and the effects of the sun, the latter being substantial at the higher altitudes. Provision is also made for the controlled or restricted flow of air through the insulating chamber, this air circulation, coupled with the foil insulation, maintaining the temperature of the chamber approximately equal to the total air temperature.

Another object of the invention is to provide a temperature probe of the class referred to in which the high velocity air of the free air stream is brought substantially to rest in the main measuring or sensing chamber where it is protected from the cooling action of the air stream. Provision is made for a minor flow of air through the measuring chamber to compensate for minor cooling due to heat conduction through the chamber walls.

A further object of the invention is to provide a temperature probe incorporating means for preventing icing of the probe, which means is constructed and arranged to have a minimum effect upon the ultimate temperature measurement.

A still further object is to provide a temperature probe which offers a minimum of drag or resistance to air flow.

Other objects and features of the invention will be readily understood from the following detailed description of a typical preferred form of the invention wherein reference will be made to the accompanying drawings in which:

Figure 1 is a longitudinal sectional view of a temperature probe of the invention illustrating the associated electrical circuit in a diagrammatic manner;

Figure 2 is a fragmentary front view taken as indicated by line 2—2 on Figure 1;

Figure 3 is an enlarged fragmentary side elevation of the temperature sensitive device;

Figures 4 and 5 are transverse sectional views taken substantially as indicated by lines 4—4 and 5—5, respectively, on Figure 1;

Figure 6 is a fragmentary side elevation of a portion of the probe body assembly; and, Figure 7 is an enlarged fragmentary sectional view of the forward portion of the probe illustrating the de-icing means.

The device of the invention comprises an elongate streamlined body assembly 10. In the form of the invention illustrated, this assembly includes a nose section 11, an intermediate section 12, and a tail section 13. The nose section 11 is an elongate tubular part formed of a suitable plastic such as a phenolic resin, or of any other selected material. The section 11 defines or provides the temperature measuring or sensing chamber C and also has the insulating chamber 14. In order to facilitate fabrication of the chambered section 11, it is preferred to construct the section in two pieces, namely, a tubular core 15 and a shell 16. The core 15 has a central longitudinal opening 17 of Venturi form having a forward divergent mouth, a smooth gradual restriction adjacent the mouth, and a rearwardly divergent portion continuing inwardly from the restriction. The rear portion of the opening 17 constitutes the measuring chamber C, and is cylindrical to receive the temperature sensitive element which will be later described. The core 15 is a relatively thin-walled part, and its external surface follows generally, the contour of the opening 17 just described.

The shell 16 surrounds the forwardly divergent forward portion of the core 15. Its rearward part is shouldered or stepped to conform to a correspondingly shouldered part of the core 15, and the two shouldered parts are rigidly joined as with cement. The forward lip portion of the shell 16 curves forwardly and inwardly toward the longitudinal axis of the device, and its edge is cemented to the core at 18. The shell 16 is spaced around the divergent forward portion of the core 15 to leave the insulating chamber 14, the details and features of which will be later described.

The intermediate section 12 of the body assembly serves to mount or carry the temperature sensitive or temperature measuring device 24, and the strut S for supporting the probe in the free air stream is preferably attached to this section. The section 12 is formed of brass, or the like, and is a tubular part of the same external diameter as the cylindrical rear portion of the nose section 11. A plug 19 is threaded in the forward end of the section 12 and extends into the section 11 to close the rear end of the measuring chamber C. Spaced screws 20 are passed through openings of the wall of the section 11, and are screwed into openings in the plug to connect the sections 11 and 12. One or more spaced lugs 21 on the forward end of the section 12 cooperate with complementary notches in the rear end of the section 11 to lock the plug 19 against unthreading. The tail section 13 of the body assembly 10 may be a plastic material part. The section 13 is set in the rear end of the intermediate section 12 and is secured thereto by one or more screws 22. The rear portion of the section 12 and the tail section 13 are conoidal or rearwardly convergent as illustrated.

The strut S for carrying the probe may be a hollow sheet member and is preferably streamlined in transverse cross section to offer a minimum of drag. The outer end of the strut S is secured to the intermediate body section 12 by silver solder, or the like, and a disc-like attaching pad 23 is secured to the inner end of the strut in a similar manner. The pad 23 is employed to mount the probe on the selected portion of the aircraft, and the strut S serves to space the probe proper from the adjacent surface of the airplane. Although I have shown a supporting strut S, it is to be understood that the device may be arranged in the nose or leading edge portion of the airplane to have its forward end exposed to the air stream. The device is preferably positioned to be clear of the slip stream and turbulence.

The temperature sensing device 24 may be any suitable instrument for translating temperature changes in the measuring chamber C into remote temperature indications. In practice, the device 24 may be in the nature of an electrical resistance "bulb" sensitive throughout the range of the ambient air temperatures. In some installations, a thermocouple may be employed as the heat responsive device 24 in order to obtain accurate, minimum lag measurements, and in other cases, a vapor pressure bulb may be used. Where the resistance bulb type device is used, it is preferably bare and without a housing, but is preferably painted with a light coat of black lacquer. The device 24 passes through a central opening in the above mentioned plug 19 to extend a considerable distance forwardly into the chamber C. As illustrated, the device 24 comprises a thin-walled electrically insulated tube 42 carrying a resistance wire 43 of platinum nickel, or the like, arranged in a helical groove in the exterior of the tube, the wire having a multiplicity of small convolutions as shown in Figure 3. The mounting flange 25 of the device 24 is engaged between the end of the plug and an internal flange 26 on the body section 12. It will be seen that the plug 19 may be threaded inwardly to clamp the device 24 in position and thereafter the plug is locked in place by the screws 20 and lugs 21 described above. The wires 27 of the heat measuring device pass outwardly through openings in the wall of the section 12 and thence through the hollow strut S to the meter M in the airplane. When a vapor pressure bulb is used, a small tube extends from the bulb and passes out through the strut S to the indicating device in the airplane.

The measuring sensing chamber C receives the ambient air during airplane flight, and means is provided to maintain a slight flow of air through the chamber so that the temperature in the chamber will change in accordance with ambient air temperature variations, and to compensate for minor cooling that takes place by reason of heat conduction through the walls of the chamber. This means includes one or more spaced ports 28 of limited capacity extending through the wall of the core 15 to place the chamber C in communication with the atmosphere. There may be three spaced ports 28 in the core adjacent the plug 19 arranged to communicate with the rear end portion of the chamber C. It will be seen that the provision of the ports 28 assures a substantially uniformly distributed continuous, but minor, air flow through the chamber C. Although there is this minor flow of air in the chamber C, the ambient high velocity air entering the mouth of the probe is substantially brought to rest in the chamber C and therefore in the region of the temperature sensitive device 24. This is necessary and important in obtaining a measurement of the total air temperature as above defined.

In accordance with the invention, the measuring chamber C is effectively insulated, both against heat conduction through the walls of the chamber, and against radiation effects. The insulating means includes the above described chamber 14, which has small openings 29 at its forward end and similar openings 30 in its rear wall, both communicating with the atmosphere to maintain a slight air flow through the chamber. In addition to the insulating chamber 14, insulation means are provided on the walls of the chambers C and 14. The surfaces or walls of the two chambers are painted with silver lacquer and one or both walls of the insulating chamber 14 are covered with two or more layers of the aluminum foil 35 or the equivalent, subsequent to being lacquered. In practice, several layers of .001 inch aluminum foil are wrapped on the external surface of the core 15 before the shell and core 15 are assembled. These provisions for insulating the chamber 14 maintain this chamber at a temperature closely approaching the temperature in the measuring chamber C and prevent heat conduction outwardly through the walls and sun radiation inwardly through the walls. The insulating chamber 14 and the insulating lacquer and foil 35 serve to maintain the temperature in the measuring chamber C at the true total air temperature with only a very small error.

The device is preferably arranged so that at least one port 28 and one port 30 are at the lower side of the body 10 to allow water to drain from the chambers C and 14.

The following are calculations of the adiabatic temperature rise:

The equation of state for air over a large range of pressures and temperatures which includes most aerodynamic conditions, can be accurately represented by the relation $$Pv = RT \qquad (1)$$

where
P = pressure
v = specific volume
R = gas constant
T = the absolute thermodynamic temperature.

The magnitude of the deviation of Equation 1 from the true equation of state for air is of the order of 1.0 per cent at 32 degrees Fahrenheit and 300 p. s. i., and 0.1 per cent at atmospheric pressure.

Equation 1 can also be written in the form $$T = \frac{P}{\rho g R} \qquad (1a)$$

where
$\rho$ = density of air
$g$ = acceleration of gravity

The adiabatic temperature rise obtained in the measuring chamber C, using Equation 1a and assuming no losses, is given by $$T_2 - T_1 = \Delta T = \frac{1}{gR}\left(\frac{P_2}{\rho_2} - \frac{P_1}{\rho_1}\right) \qquad (2)$$

From the fundamental equation for the conservation of energy in a gas $$\frac{V_1^2}{2} + \frac{\gamma}{\gamma-1}\frac{P_1}{\rho_1} = \frac{V_2^2}{2} + \frac{\gamma}{\gamma-1}\frac{P_2}{\rho_2} \qquad (3)$$

thus $$\frac{P_2}{\rho_2} = \frac{\gamma-1}{\gamma}\left(\frac{V_1^2}{2} - \frac{V_2^2}{2} + \frac{\gamma}{\gamma-1}\frac{P_1}{\rho_1}\right) \qquad (3a)$$

substituting in Equation 2

$$\Delta T = \frac{\gamma-1}{2gR\gamma}(V_1^2 - V_2^2) \qquad (4)$$

where $\gamma$ = ratio of specific heat at constant pressure to specific heat at constant volume. If $V_2$ is assumed equal to 0, then the equation for 100 per cent adiabatic rise is obtained $$\Delta T = \frac{\gamma-1}{\gamma}\frac{V_1^2}{2gR} \qquad (5)$$

If R = 53.345 or ft./° F. and g. = 32.174 ft./sec.² and $\gamma$ = 1.400, then $$\Delta T = 1.790\left(\frac{V}{100}\right)^2 \qquad (6)$$

where V is expressed in miles per hour true speed and $\Delta T$ in °F.

The above equation is for dry air. The effect of moisture in the air is to decrease the amount of adiabatic rise. This effect is not large. The theoretical rise in temperature for wet air is $$\Delta T = 1.790\frac{C_p}{C_{pw}}\left(\frac{V}{100}\right)^2 \qquad (6a)$$

where
$C_p$ = the specific heat for dry air, and
$C_{pw}$ = the specific heat for wet air.

If air is saturated with water at 100° Fahrenheit at 29.93 in Hg, the error in computed $\Delta T$ assuming dry air will be +3.7 per cent, i. e., $$\frac{C_p}{C_{pw}} = 0.963$$

In the actual probe $V_2$ does not equal zero. Since $A_3$ is smaller than $A_1$, it will govern the flow. Thus from the equation of continuity $$V_2 = \frac{\rho_3 A_3 V_1}{C_2 A_2}$$

assume $$C_2 = \rho_3$$

then $$V_2 = \frac{A_3}{A_2}V_1$$

The following are derived from dimensions of a typical embodiment of the invention $A_1 = \frac{1}{4}\pi(.2)^2 = 0.0314$ square inch (inlet area of the of the measuring chamber)
$A_2 = \frac{1}{4}\pi(.06)^2 = 0.283$ square inch (measuring chamber area)
$A_3 = \frac{1}{4}\pi(.102)^2 \times 3 = .0236$ square inch (outlet area of the measuring chamber)

thus $$V_2 = 0.083 V_1$$

substituting in Equation 4

$$\Delta T \text{ (probe)} = \frac{\gamma-1}{\gamma}\frac{V_1^2}{2gR}(1-0.083)^2$$
$$= 0.993\frac{\gamma-1}{\gamma}\frac{V_1^2}{2gR}$$
$$= 0.993 \Delta T \text{ (100 per cent)}$$

Thus the temperature probe will have an error of 0.7% provided no energy is lost from the inside of the probe.

In certain installations, it may be desirable or necessary to prevent the accumulation of ice on the probe. Where the conditions are conducive to icing, the ice will tend to accumulate on the nose section 11 and unless appropriate measures are taken to prevent this, the entrance of the measuring chamber C may become partially or entirely obstructed. In the drawings I have shown an electrical heating element 40 associated with the shell 16 to prevent icing of the probe. The element 40 may comprise a plurality of turns of Nichrome wire of a suitable gauge directly embedded in the forward wall portion of the shell 16 in such a manner that the turns surround the insulating chamber 14. The heating element is close to the surface of the probe and arranged within its leading end to dependably prevent the accumulation of ice. The electrical leads 41 for the heating element 40 pass rearwardly through openings in the sections 11 and 12 and the plug 19 to continue outwardly through the strut S to a suitable source of electrical energy in the airplane.

From the foregoing detailed description, it will be seen that I have provided a practical and dependable device for accurately measuring the total air temperature during the flight of an airplane at high or relatively high velocities. By bringing the air practically to rest in the measuring chamber A, it is possible to obtain the measurement of the full adiabatic temperature rise. The insulation chamber 14, the foil 35 and the silver lacquer protect the measuring chamber C against the loss of heat by conduction through the chamber walls to the cooler free air stream, and also protect the chamber against the radiating heat effects of the sun. The insulating chamber 14, the foil 35, and the lacquer also shield the measuring chamber C against the heat of the heating element 40 when the latter is in service. The device is simple to manufacture and easily serviced.

Having described only a typical form of the invention, I do not wish to be limited to the specific details herein set forth, but wish to reserve to myself any variations or modifications that may appear to those skilled in the art and/or fall within the scope of the following claims.

I claim:

1. A temperature probe for use in an air stream for measuring the air temperature plus the adiabatic temperature rise thereof, the probe comprising a body having a chamber provided with an air receiving inlet facing forwardly in said stream, there being spaced ports in the periphery of the body communicating with the chamber allowing a limited escape of air from the rear portion of the chamber, said inlet and port means being related in capacity so that the entering air is brought substantially to rest in the chamber, the body having an insulating chamber in surrounding relation to the first chamber and ports communicating with the insulating chamber to allow a limited air flow therethrough, means on at least one wall of the insulating chamber for preventing heat conduction therethrough, and a temperature sensitive device in said chamber.

2. A temperature probe for measuring the temperature of an air stream comprising a body to be supported in the air stream and having a chamber provided at its forward end with a Venturi form inlet facing forwardly in the air stream, the body having port means communicating with the rear portion of the chamber, the capacities of the inlet and port means being so related in capacity that the air entering the chamber is substantially brought to rest therein to effect an adiabatic temperature rise, an electrical circuit including a temperature indicating instrument and a device in the chamber responsive to the temperatures therein to affect said circuit and thus operate said instrument, and means for insulating said chamber including a wall on the body defining a chamber which surrounds the first named chamber and ports of limited capacity maintaining the last named chamber in communication with the air stream, and metal foil on the wall of the last named chamber.

3. A temperature probe for measuring the temperature of an air stream comprising a body to be supported in the air stream and having a chamber provided at its forward end with a Venturi form inlet facing forwardly in the air stream, the body having port means communicating with the rear portion of the chamber, the capacities of the inlet and port means being so related in capacity that the air entering the chamber is substantially brought to rest therein to effect an adiabatic temperature rise, an electrical circuit including a temperature indicating instrument and a device in the chamber responsive to the temperatures therein to affect said circuit and thus operate said instrument, and means for insulating said chamber including a wall on the body defining an insulating chamber which surrounds the first named chamber and ports of limited capacity maintaining the insulating chamber in communication with the air stream, and metallic paint on the walls of said chambers.

4. A temperature probe for measuring the temperature of an air stream comprising a body to be supported in the air stream and having a chamber provided at its forward end with a Venturi form inlet facing forwardly in the air stream, the body having port means communicating with the rear portion of the chamber, the capacities of the inlet and port means being so related in capacity that the air entering the chamber is substantially brought to rest therein to effect an adiabatic temperature rise, an electrical circuit including a temperature indicating instrument and a device in the chamber responsive to the temperatures therein to affect said circuit and thus operate said instrument, and means for insulating said chamber including a wall on the body defining an insulating chamber which surrounds the first named chamber and ports of limited capacity maintaining the insulating chamber in communication with the air stream, silver lacquer on the walls of said chambers, and aluminum foil covering at least one wall of the insulating chamber.

5. A temperature probe for measuring the temperature of an air stream comprising an elongate tubular nose section having a main air inlet opening of Venturi form provided with a forwardly divergent mouth and a rearwardly divergent inner portion and having a temperature measuring chamber extending rearwardly from said inner portion, the nose section also having an insulating chamber surrounding the main air inlet opening, ports of limited capacity communicating with the front and rear ends of the insulating chamber to provide for limited air flow through the insulating chamber, and circumferentially spaced ports of less aggregate fluid capacity than the main air inlet opening communicating with the rear part of the measuring chamber at its periphery, an intermediate section including a plug fitting the rear end of the measuring chamber, an electrical temperature sensing device projecting forwardly from the plug into the measuring chamber, a strut projecting laterally from the intermediate section for supporting the probe in the air stream, electrical connections extending through the strut to said sensing device, and a streamlined rear section extending rearwardly from the intermediate section.

WALTER L. HOWLAND.

(References on following page)

REFERENCES CITED

The following references are of record in the file of this patent:

UNITED STATES PATENTS

| Number | Name | Date |
|---|---|---|
| 1,314,249 | Crowell, Jr. | Aug. 26, 1919 |
| 1,785,662 | Waterloo | Dec. 16, 1930 |
| 1,971,534 | Peace, Jr. | Aug. 28, 1934 |
| 2,182,280 | Chipley et al. | Dec. 5, 1939 |
| 2,414,370 | Floyd | Jan. 14, 1947 |

OTHER REFERENCES

Henrickson Research Paper No. 222, Bureau of Standards, Journal of Research, vol. 5, September 1930, pages 702 and 706.

Franz (article) N. A. C. A. Technical Memorandum No. 953, September 1940, 6 pp. text, 2 shts. figs. Pages 3 to 6 of text, and the sheet of dwg. containing Figs. 6 to 10.